United States Patent [19]

Crompton et al.

[11] 4,051,064

[45] * Sept. 27, 1977

[54] PROCESS FOR MAKING COLLOIDAL SOLS OF ANTIMONY PENTOXIDE IN POLYHYDROXY ALCOHOLS

[75] Inventors: Charles E. Crompton, Arlington Heights, Ill.; Abdulla M. Z. Kazi, Euclid, Ohio

[73] Assignee: Chemetron Corporation, Chicago, Ill.

[*] Notice: The portion of the term of this patent subsequent to Nov. 30, 1993, has been disclaimed.

[21] Appl. No.: 713,152

[22] Filed: Aug. 10, 1976

Related U.S. Application Data

[63] Continuation-in-part of Ser. No. 605,287, Aug. 18, 1975, Pat. No. 3,994,825.

[51] Int. Cl.² ............................................. B01J 13/00
[52] U.S. Cl. .................................... 252/309; 252/8.1; 252/314; 423/87; 423/617
[58] Field of Search ...................... 252/309, 8.1, 314; 423/617, 87

[56] References Cited

U.S. PATENT DOCUMENTS

| | | | |
|---|---|---|---|
| 3,676,362 | 7/1972 | Yates | 252/8.1 X |
| 3,676,477 | 7/1972 | Chay et al. | 252/8.1 X |
| 3,860,523 | 1/1975 | Petrow et al. | 252/313 R X |
| 3,994,825 | 11/1976 | Crompton et al. | 252/309 |

*Primary Examiner*—Benjamin R. Padgett
*Assistant Examiner*—E. Suzanne Park
*Attorney, Agent, or Firm*—N. M. Esser

[57] ABSTRACT

A colloidal dispersion of hydrous antimony pentoxide particles is made by a process which comprises introducing particles of an oxidizable antimony oxide into an aliphatic polyhydroxy alcohol having vicinal hydroxyl groups and contacting said particles with aqueous hydrogen peroxide at a temperature of from about 0° C to about the decomposition temperature of the reaction mixture for a length of time sufficient to convert at least a portion of said particles to colloidal particles of hydrous antimony pentoxide.

9 Claims, No Drawings

PROCESS FOR MAKING COLLOIDAL SOLS OF ANTIMONY PENTOXIDE IN POLYHYDROXY ALCOHOLS

CROSS-REFERENCE TO RELATED APPLICATION

This application is a continuation-in-part of application Ser. No. 605,287, filed Aug. 18, 1975, now U.S. Pat. No. 3,994,825.

BACKGROUND OF THE INVENTION

The role of antimony compositions in the flameproofing of various polymers has been known for many years. One problem associated with many of the prior art antimony compositions used in flameproofing systems is the delustering of fibrous polymers. This problem may be overcome by providing an antimony composition of sufficiently small particle size, significantly less than one micron, so that the particles do not scatter light and thus do not deluster the treated polymer.

Another difficulty associated with the use of an antimony composition in flameproofing polymers lies in the incorporation of the antimony compositions in the polymer. It is desirable to mix the antimony composition with a solution of the polymer in a polar organic spinning or casting solvent prior to final product fabrication. Many prior art compositions of antimony are neither soluble nor readily dispersible in the polar organic solvents commonly used in polymer formulations.

Several methods for preparing colloidal dispersions of antimony pentoxide for use as flameproofing agents for plastics, fibers, elastomers and other polymeric compositions are known in the art. For example, U.S. Pat. No. 3,860,523 teaches a method for forming colloidal antimony pentoxide by deionizing potassium antimonate with a cation exchange resin. Another method for forming sols of antimony pentoxide is shown by U.S. Pat. No. 3,657,179 which teaches the use of antimony trichloride and nitric acid to form a dispersion in a polar organic solvent, and stabilization of the dispersion with an alpha-hydroxy carboxylic acid. The dispersions taught by the U.S. Pat. No. 3,657,179 contain from 0.01% to 5% water by weight.

The formation of pentavalent antimony compositions by the oxidation of trivalent antimony compositions with hydrogen peroxide is also known in the art. U.S. Pat. No. 3,836,557 shows a method for preparing water soluble salts of pentavalent antimony glycol esters by reacting antimony trioxide with hydrogen peroxide in ethylene glycol under vacuum to remove the water of reaction. U.S. Pat. No. 3,676,477 teaches the formation of pentavalent antimony esters by reacting antimony trioxide with hydrogen peroxide in a polyhydroxy alcohol with distillation to remove the water of reaction.

Many of the foregoing methods require expensive procedures for formulating compositions which can be employed effectively in relatively few polymer systems.

It is therefore an object of this invention to provide a stable dispersion of hydrous antimony pentoxide and a process for making said dispersion.

Another object of this invention is to provide hydrous antimony pentoxide sols which can be employed as flame retardant agents in natural and synthetic fibers and other polymeric materials, and a process for making said sols.

A further object of this invention is to provide an economical process for making hydrous antimony pentoxide sols from commercial grades of antimony trioxide.

Other objects of this invention will become readily apparent from the following description of the invention.

SUMMARY OF THE INVENTION

The objects of this invention may be accomplished by a method which comprises introducing particles of an oxidizable antimony oxide into an aliphatic polyhydroxy alcohol having vicinal hydroxy groups and contacting said particles with aqueous hydrogen peroxide at a temperature of from about 0° C to about the decomposition temperature of the reaction mixture for a length of time sufficient to convert at least a portion of said particles to colloidal particles of hydrous antimony pentoxide. The contacting of the particles with aqueous hydrogen peroxide may also be done in the presence of a halogen acid selected from the group consisting of hydrogen chloride and hydrogen bromide.

DESCRIPTION OF THE PREFERRED EMBODIMENTS

As used in the description of and claims to this invention, the term "oxidizable antimony oxide" means an oxide of antimony and hydrates thereof in which the valence of at least a portion of the antimony is less than five. Said oxides are essentially non-ionic. Examples of said oxides include the trioxide and tetraoxide, a mixture of oxides represented by the formula $Sb_6O_{13}$, antimony oxyhydrate, the antimony oxychlorides and the like.

Any form of antimony trioxide, a preferred starting material, may be used in the practice of this invention. Preferably, the antimony trioxide will have the senarmontite structure such as does the commercially available antimony trioxide which is sold by Chemetron Corporation under the designation Fire-Shield High-Tint antimony trioxide. Such commercially available antimony trioxide is useful even though it is much less reactive than freshly precipitated antimony oxide or hydrated antimony trioxide and is preferable in the practice of this invention because of its lower cost.

The colloidal sols are formed in a polyhydroxy alcohol containing a quantity of water. The polyhydroxy alcohols that are useful in the practice of this invention are aliphatic polyhydroxy alcohols having vicinal hyroxyl groups. Preferably the polyhydroxy alcohols contain two to six carbon atoms. The polyhydroxy alcohols that are especially useful in the practice of this invention are glycerol, ethylene glycol, 1,2-propanediol, 1,2-butanediol, 2,3-butanediol, trimethylol propane, and the like.

The halogen acids that are useful in the practice of this invention are hydrogen chloride and hydrogen bromide. The halogen acid is preferably added to the reaction mixture as an aqueous solution for convenience although gaseous hydrogen halide may be introduced into the reaction mixture if desired. Most preferably, the halogen acid is hydrogen chloride and is introduced into the reaction mixture as an aqueous solution containing 37% hydrogen chloride, by weight.

The concentration of the aqueous solution of hydrogen peroxide which may be employed in the practice of this invention is not critical. The hydrogen peroxide which is preferable in the practice of this invention, because of its lower cost, is a commercially available aqueous solution containing 35% hydrogen peroxide, by weight. If a colloidal dispersion containing a small amount of water (such as approximately 5% water, by weight) is desired, it is preferable to introduce the hydrogen peroxide as an aqueous solution containing 70% hydrogen peroxide, by weight. The stoichiometric ratio of hydrogen peroxide to oxidizable antimony is generally employed. The number of equivalents of oxidizable antimony is, of course, the product of the number of oxidizable antimony atoms in the oxide times the difference between 5, the maximum valence of antimony, and the valence of such oxidizable antimony atoms. More or less hydrogen peroxide may be employed if it is so desired; the use of less than a stoichiometric amount will lessen the amount of colloidal product while the use of more may sometimes be desired to off-set any losses of the hydrogen peroxide. In the case of antimony trioxide, the hydrogen peroxide is preferably used in a 2:1 molar ratio of hydrogen peroxide to antimony trioxide. One equivalent of hydrogen peroxide is thus present for each equivalent of trivalent antimony. The hydrogen peroxide thus reacts with the antimony trioxide according to the following equation:

$$Sb_2O_3 + 2 H_2O_2 \rightarrow Sb_2O_5 + 2 H_2O$$

The particles of hydrous antimony pentoxide in the dispersion of this invention may exist in many different hydrated forms, the exact nature of which is not fully known. One possible hydrated form is $Sb_4O_6(OH)_8$. Such a structure would have a tetrahedral configuration with a pentavalent antimony atom located at each apex of the tetrahedron. Two hydroxyl groups would be attached to each antimony atom which, in turn, would be bonded to each of the remaining three antimony atoms by Sb-O-Sb linkages. Another possible form of the hydrated antimony pentoxide is $Sb(OH)_5$ in which five hydroxyl groups are bonded to any given pentavalent antimony atom. It is contemplated that many solvated forms of antimony pentoxide may exist in the colloidal dispersions of this invention, all of which are included in the term hydrous antimony pentoxide. The concentration of antimony in the dispersion is not critical.

The contacting of the oxidizable antimony oxide particles with hydrogen peroxide may be accomplished at any temperature from about 0° C to about the decomposition temperature of the reaction mixture and preferably between about 50° C and about 105° C. The colloidal sol which results from the contacting of said antimony oxide with the hydrogen peroxide is a stable colloidal dispersion of antimony pentoxide particles having an average size of from about 50A to about 200A.

The polyhydroxy alcohol acts as both a stabilizer and a dispersion medium. Since the polyhydroxy alcohol is a stabilizer for colloidal dispersion of hydrous antimony pentoxide, the relatively large amount of polyhydroxy alcohol, which is present during the oxidation of antimony trioxide, for example, to antimony pentoxide, apparently acts to lower the activation energy for the oxidation of the trivalent antimony to pentavalent antimony and thus promotes the formation of colloidal antimony pentoxide.

The polyhydroxy alcohol also acts as the dispersion medium for the colloidal sols. The polyhydroxy alcohol medium contains water, usually at a concentration of from about 5% to about 10% of the total weight of the product sol but larger concentrations of water can be tolerated without altering the colloidal dispersion. The major portion of the water is usually introduced into the polyhydroxy alcohol medium through the addition of an aqueous hydrogen peroxide solution which usually contains about 35% hydrogen peroxide and about 65% water.

When the oxidizable antimony oxide particles are initially contacted with hydrogen peroxide, the dispersion medium consists essentially of a polyhydroxy alcohol, hydrogen peroxide, and water. There is suspended in the dispersion medium a large amount of non-colloidal particles of said antimony oxide. As these particles are contacted with hydrogen peroxide for an increasingly longer period of time, the non-colloidal particles are removed from the suspended state and converted into dispersed colloidal particles of hydrous antimony pentoxide. After the oxidizable antimony oxide particles have been contacted with the hydrogen peroxide for a finite period of time, the dispersion contains relatively high concentrations of hydrogen peroxide and water, and a relatively low concentration of antimony, disregarding the non-colloidal particles which are merely suspended in the dispersion medium. As the reaction proceeds, the concentrations of hydrogen peroxide and water in the dispersion continuously decrease. The product dispersion will usually contain a concentration of antimony of from about 0.01% to about 10%, by weight. The practical upper limit on the concentration of antimony in the dispersion is the concentration of antimony at which gel formation begins to occur. The final dispersion will usually contain approximately 10% water, by weight.

It may be desirable to introduce a halogen acid selected from the group consisting of hydrogen chloride and hydrogen bromide into the polyhydroxy alcohol dispersion medium so that the halogen acid is present for at least a portion of the time during which the oxidizable antimony oxide is oxidized to antimony pentoxide. If a halogen acid is present for at least a portion of the time during which particles of oxidizable antimony oxide are contacted with hydrogen peroxide, a smaller particle size is achieved in the resultant sol than in a sol prepared in a similar manner but without the use of a halogen acid.

Preferably, a halogen acid is added to the polyhydroxy alcohol dispersion medium prior to the contacting of the oxidizable antimony oxide particles with hydrogen peroxide. The halogen acid is usually employed in a molar ratio of halogen acid to antimony of from about 0.01:1 to about 5:1. Larger concentrations of halogen acid may be employed but such concentrations tend to increase the acidity of the resultant sols, a characteristic which is undesirable for many end-use applications. Preferably, the halogen acid is employed in a molar ratio of halogen acid to antimony of from about 0.1:1 to about 1:1, and most preferably, about 0.5:1.

When halogen acid is present during the contacting of the oxidizable antimony oxide with hydrogen peroxide, the reaction temperature may be from about 0° C to about the decomposition temperature of the reaction mixture. Preferably the reaction temperature is from about 50° C to about 105° C.

The use of antimony oxides to aid the flame resistance of various polymeric compositions is well known. It is preferable to use sub-micron sized particles of antimony oxide so that fibers which are treated with the antimony oxide are not delustered or plastics opacified. The colloidal dispersions of this invention are well suited for use in synthetic fibers and plastics because the average particle size of the sol is from about 50 A to about 200 A and the sols are compatible with many organic solvents which are used for the spinning and film casting of many polymers. Examples of such solvents are methanol, ethylene glycol, acetic acid, dimethyl formamide, dimethyl acetamide, formamide, trimethylolpropane and the like. Examples of polymers which may be treated with the products of this invention include polyacrylonitrile, copolymers of acrylonitrile with vinyl and vinylidene halides, polyamides, polyesters, polyurethanes, polyacrylates, polyvinyl chloride, acrylonitrilebutadiene-styrene polymers, and the like.

The following specific examples are for purposes of illustration only and are not intended to limit the scope of the invention. All percentages are by weight, unless otherwise indicated. In all cases, the antimony trioxide is Fire-Shield High-Tint antimony trioxide from Chemetron Corporation and the hydrogen peroxide solution is a commercially available aqueous solution containing 35% hydrogen peroxide by weight. The products made by the following examples may be filtered to remove undesired suspended particles.

While the invention has been described with reference to certain specific embodiments, it will be recognized by those skilled in the art that many variations are possible without departing from the spirit and scope of the invention.

EXAMPLE I 11.5 grams (0.12 mole) of hydrogen peroxide solution is added over a 20 minute period to a stirring mixture of 100 grams (1.67 moles) of ethylene glycol and 29 grams (0.10 mole) of antimony trioxide while maintaining the temperature of the mixture at 90°–95° C. The stirring is continued for an additional 1 hour and 40 minutes and a colloidal dispersion of hydrous antimony pentoxide is obtained. The size of the particles in the dispersion is about 150-200 A.

EXAMPLE II 7.5 grams (0.076 mole) of 37% hydrochloric acid is added to 140.3 grams (2.34 moles) of ethylene glycol, with stirring. 22.1 grams of antimony trioxide (0.0758 mole) is added to the stirring mixture, at room temperature followed by the addition of 14.7 grams (0.151 mole) of hydrogen peroxide. The temperature rises to about 90° C and is maintained at such temperature for about 30 minutes. A colloidal dispersion of hydrous antimony pentoxide particles having an average size of about 50 A is formed.

EXAMPLE III 11.5 grams (0.12 mole) of hydrogen peroxide solution is mixed with 50 grams of ethylene glycol and added to a stirring mixture of 29 grams of antimony oxide in 100 grams of ethylene glycol at a temperature of approximately 65° C, over a thirty minute period. The reaction mixture is allowed to stir for an additional 1 hour. A colloidal dispersion of hydrous antimony pentoxide particles having an average size of 70-120 A is formed.

What we claim is:

1. A process for making a colloidal dispersion of hydrous antimony pentoxide particles comprising introducing particles of an oxidizable antimony oxide into an aliphatic polyhydroxy alcohol having vicinal hydroxyl groups and contacting said particles with aqueous hydrogen peroxide at a temperature of from about 0° C to about the decomposition temperature of the reaction mixture for a length of time sufficient to convert at least a portion of said particles to colloidal particles of hydrous antimony pentoxide.

2. The process of claim 1 wherein the polyhydroxy alcohol contains 2 to 6 carbon atoms.

3. The process of claim 2 wherein the polyhydroxy alcohol is selected from the group consisting of glycerol, ethylene glycol, 1,2-propanediol, 1,2-butanediol, 2,3-butanedio and trimethylolpropane.

4. The process of claim 1 further characterized by contacting said particles with aqueous hydrogen peroxide in the presence of a halogen acid selected from the group consisting of hydrogen chloride and hydrogen bromide.

5. The process of claim 4 wherein the polyhydroxy alcohol contains 2 to 6 carbon atoms.

6. The process of claim 5 wherein the polyhydroxy alcohol is selected from the group consisting of glycerol, ethylene glycol, 1,2-propanediol, 1,2-butanediol, 2,3 butanediol, and trimethylol propane.

7. The process of claim 6 wherein the molar ratio of halogen acid to antimony is from about 0.1:1 to about 1:1.

8. The process of claim 7 wherein the halogen acid is hydrogen chloride and the molar ratio of halogen acid to antimony is about 0.5:1.

9. The process of claim 8 wherein the reaction temperature is from about 50° C to about 105° C.

* * * * *